Aug. 29, 1967     J. W. ISDALE     3,338,583
VARIABLE PRESSURE SHAFT SEAL
Filed Feb. 3, 1964
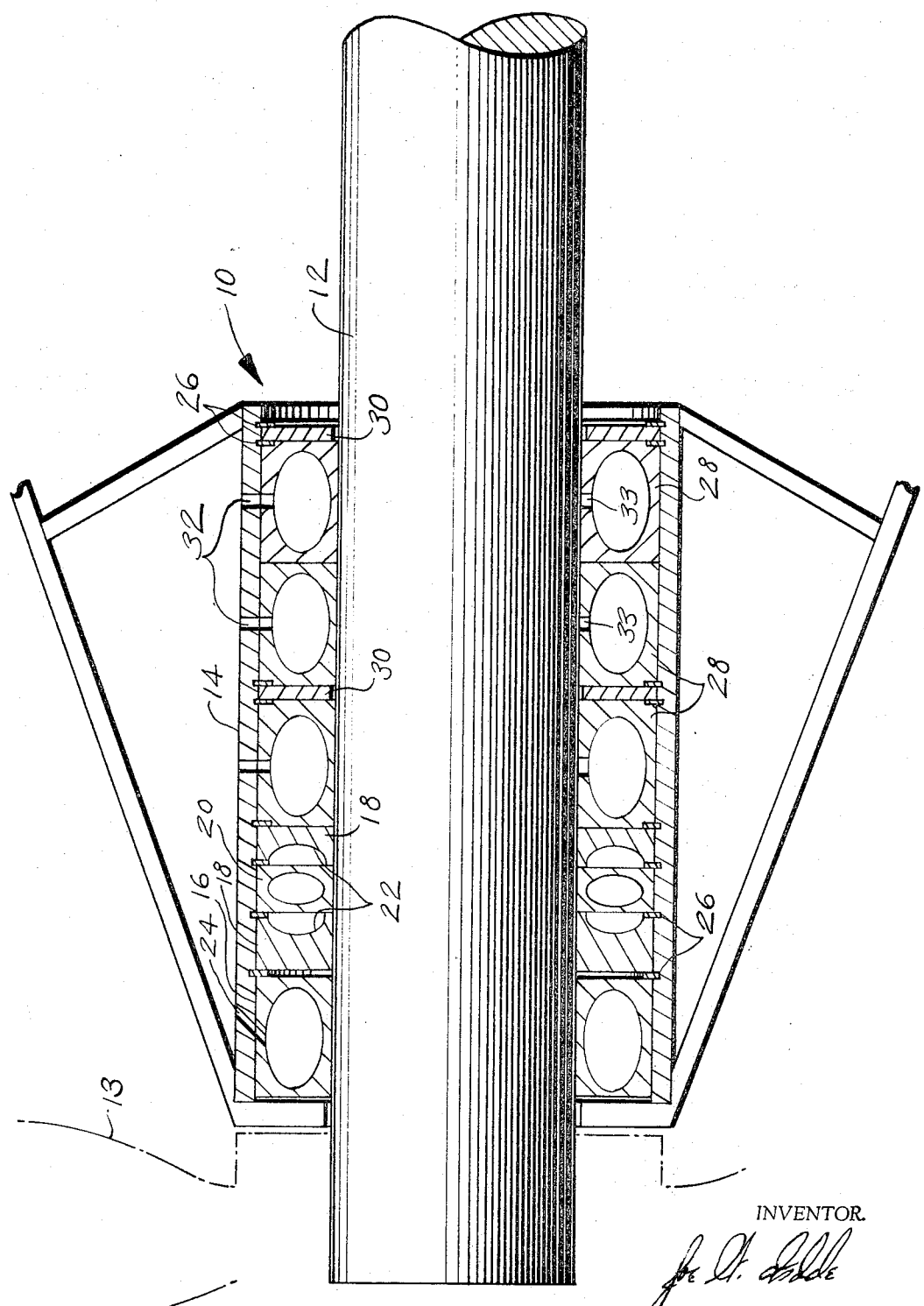
INVENTOR.

United States Patent Office 3,338,583
Patented Aug. 29, 1967

3,338,583
VARIABLE PRESSURE SHAFT SEAL
Joe W. Isdale, 6445 Sharpview Drive,
Houston, Tex. 77027
Filed Feb. 3, 1964, Ser. No. 342,113
2 Claims. (Cl. 277—34.3)

This invention relates to pressurized sealing devices, and more particularly to expanding and contracting seals.

It is an object of the present invention to provide a variable pressure seal which can be used as a brake, as a holding device, and as a snap ring, and when a plurality of seals are used, the replacement of the seals can be accomplished while the shaft is being rotated.

Another object of the present invention is to provide a variable pressure seal which will be applied to a submarine screw shaft. A great deal of pressure is not needed to keep the water out near the water surface, and it is not necessary to have the extra friction loss of a tight seal. Also, a simple means exists to replace wear of the seal by increasing the pressure inside the seal.

A further object of the present invention is to provide a variable pressure seal which can be used as a holding tool, the seal not being rough on the surface of the shaft like the chuck of oil wells on drill stems.

In use as a chuck a hydraulic system may be built to control pressure, and the power for the hydraulic system fed by electrical slip-rings. In use as a snap ring, a shaft may be moved in or out of location by deflation of a slipring seal.

When used as a brake, the surface will have a smooth contact around the brake drum or shaft and for deep applications, a Teflon seal with stainless steel ply will handle any reasonable pressure.

Other objects of the invention are to provide a variable pressure seal bearing the above objects in mind which is of simple construction, has a minimum number of parts, is inexpensive to manufacture and efficient in operation and use.

For other objects and for a better understanding of the invention, reference may be had to the following detailed description taken in conjunction with the accompanying drawing, in which:

The figure is a horizontal view of the present invention shown in section.

Referring now more in detail to the drawing, a variable pressure seal 10 made in accordance with the present invention is shown to include a shaft 12 having a propeller 13 secured to it. Shaft 12 is received within an elongated sleeve 14. Within sleeve 14 a hollow angular ring 16 encircles shaft 12 and is made of a flexible and expandible material, such as plastic or rubber or the like. A pair of spaced apart hollow rings 18 are received within sleeve 14 around shaft 12, and a hollow pressure safety ring 20 abuts with hollow rings 18 on either side. Hollow ring 20 is a pressure safety ring providing pressure system safety for variable pressure seal 10. Rings 18 are expandible within the recesses 22 provided on either side of pressure safety ring 20. An opening 24 through sleeve 14 in hollow ring 16 provides a means for the entrance of fluid or air under pressure which expands ring 16 against the outer periphery of shaft 12 and the inner periphery of sleeve 14. A plurality of snap rings 26 are spaced apart within sleeve 14 and provide a means for locking the heretofore mentioned components within sleeve 14. A plurality of removable and expandible hollow rings 28 are received within sleeve 14 behind rings 18 and section rings 30 between a pair of removable hollow rings 28 spaces them apart and shaft 12 freely receives section rings 30. A plurality of snap rings 26 received within sleeve 14 provide a means for quick and easy removal and replacement for rings 28. Rings 28 are provided with an opening 32 which extends outward through sleeve 14 and allows oil or other fluid under pressure to cool rings 28.

A grove of elongated configuration through removable hollow rings 28 provides a means for oil to enter and lubricate shaft 12.

In operation, rings 16, 20, 28 and the sleeve 14 with the combination of snap rings 26 prevent water from entering sleeve 32 and into the submarine or ship.

It shall be noted that the pressure may be varied along shaft 12 by increasing or decreasing any combination of expandible rings and wear may be compensated for by increasing the pressures within the rings.

It shall further be noted that materials possessing the qualities of expandability and elasticity should be more or less of the anti-friction type.

While various changes may be made in the detail construction, it shall be understood that such changes shall be within the spirit and scope of the present invention as defined by the appended claims.

What I claim as new and desire to protect by Letters Patent of the United States is:

1. A variable pressure seal for cooperation with a rotatable shaft, comprising:
   (a) a sleeve adapted to be freely receivable about a rotatable shaft;
   (b) a plurality of removable, hollow, expandible annular rings carried within said sleeve and section rings between said expandible rings providing spacer means between said expandible rings;
   (c) snap ring retaining means for securing said rings interiorly of said sleeve and in alignment for sealing engagement with the exterior of the rotatable shaft;
   (d) passage means in said rings for permitting fluid circulation therethrough;
   (e) opening means in said rings communicating with said passage means for receiving pressure fluid therein for expanding said rings radially into sealing contact with the rotatable shaft; and,
   (f) said rings including therewith an expandible safety ring between a pair of rings having facing annular recesses for receiving expansion of said safety ring.

2. The invention of claim 1 wherein said snap ring retaining means are removably received in annular grooves in said sleeve.

References Cited

UNITED STATES PATENTS

| | | | |
|---|---|---|---|
| 1,043,065 | 11/1912 | Cash | 277—226 X |
| 1,809,407 | 6/1931 | Fox | 277—226 |
| 3,121,570 | 2/1964 | Gilbert | 277—34.3 |

FOREIGN PATENTS

| | | |
|---|---|---|
| 297,841 | 5/1917 | Germany. |
| 444,841 | 3/1936 | Great Britain. |
| 651,114 | 3/1951 | Great Britain. |
| 820,026 | 9/1959 | Great Britain. |

CLARENCE R. GORDON, Primary Examiner.

ALAN COHAN, Examiner.